(12) United States Patent
Yalagandula et al.

(10) Patent No.: US 11,930,121 B2
(45) Date of Patent: Mar. 12, 2024

(54) BLOCKCHAIN INDEX TRACKING

(71) Applicant: MerQube, Inc., San Francisco, CA (US)

(72) Inventors: Praveen Yalagandula, San Francisco, CA (US); Vinit Srivastava, New Canaan, CT (US); Keith Loggie, Garden City, NY (US)

(73) Assignee: MERQUBE, INC., San Francisco, CA (US)

( * ) Notice: Subject to any disclaimer, the term of this patent is extended or adjusted under 35 U.S.C. 154(b) by 352 days.

(21) Appl. No.: 17/487,756

(22) Filed: Sep. 28, 2021

(65) Prior Publication Data

US 2022/0103367 A1 Mar. 31, 2022

Related U.S. Application Data

(60) Provisional application No. 63/085,925, filed on Sep. 30, 2020.

(51) Int. Cl.
  *H04L 9/32* (2006.01)
  *G06F 16/22* (2019.01)
  *G06F 21/64* (2013.01)
  *H04L 9/00* (2022.01)

(52) U.S. Cl.
  CPC ............ *H04L 9/3239* (2013.01); *G06F 16/22* (2019.01); *H04L 9/3247* (2013.01); *H04L 9/50* (2022.05)

(58) Field of Classification Search
  CPC ....... H04L 9/3239; H04L 9/3247; H04L 9/50; H04L 9/3297; G06F 16/22; G06F 16/2255; G06F 21/64
  See application file for complete search history.

(56) References Cited

U.S. PATENT DOCUMENTS

| | | | |
|---|---|---|---|
| 9,892,460 | B1 | 2/2018 | Winklevoss et al. |
| 10,354,325 | B1 | 7/2019 | Skala et al. |
| 10,656,894 | B2 * | 5/2020 | Fryman ..................... G06F 1/12 |
| 2020/0210410 | A1 * | 7/2020 | Li ............................ G06F 16/22 |
| 2020/0213117 | A1 * | 7/2020 | Resch ................... H04L 9/3268 |

FOREIGN PATENT DOCUMENTS

| | | |
|---|---|---|
| CN | 109189782 A | 1/2019 |
| CN | 111448579 A | 7/2020 |
| WO | WO 2017/134281 A1 | 8/2017 |

OTHER PUBLICATIONS

Data Query Mechanism Based on Hash Computing Power of Blockchain in Internet of Things, by Wang et al., published 2019 (Year: 2019).*
PCT International Search Report and Written Opinion, PCT Application No. PCT/US2021/52401, dated Jan. 10, 2022, 15 pages.

* cited by examiner

*Primary Examiner* — Vu V Tran
(74) *Attorney, Agent, or Firm* — FENWICK & WEST LLP

(57) ABSTRACT

Each index value and primary data for generating the index value are stored in a block of a blockchain. The primary data is received from a set of data sources, each associated with one or more index components of the index. Based on the received primary data, the index value is generated. A cryptographic hash value is generated based on the received primary data, the generated index value, and a previous hash value corresponding to a previous time period. The generated index value, the received primary data, and the generated cryptographic hash value are stored in a new block of the blockchain.

20 Claims, 4 Drawing Sheets

BLOCKCHAIN INDEX TRACKING

CROSS REFERENCE TO RELATED APPLICATIONS

This application claims the benefit of U.S. Provisional Application No. 63/085,925, filed Sep. 30, 2020, which is incorporated by reference in its entirety.

BACKGROUND

This disclosure relates generally to securely storing primary data associated with a time series, and more specifically, to storing the primary data in blocks of a blockchain and applying cryptographic algorithms to authenticate the stored primary data and maintain the integrity of the stored data.

Indices are typically composed of multiple index components. An index value of an index is then calculated by applying an index algorithm to primary data associated with each of the index components of the index. For example, each index component is associated with a time series having component values for each time period of a set of time periods. The primary data may be provided by one or more data sources that publish and store the component values for each of the components.

However, the data sources may periodically re-evaluate previous values in a time series and may update those old values as more data is available. As such, when an entity tries to re-calculate an old index value (i.e., an index value for a given time period in the past), the primary data corresponding to the given time period may differ from the primary data that was available when the index value was first calculated. For example, an entity may access the data sources on Jan. 1, 2022 to retrieve the primary data for calculating the index value corresponding to Jan. 1, 2010. However, the version of the primary data for Jan. 1, 2010 provided by the data source for each of the index components when the data source is accessed on Jan. 1, 2022 may differ from the version of the primary data provided by the same data source for each of the index components when the index value was calculated on Jan. 1, 2010. As such, the index value for Jan. 1, 2010 calculated on Jan. 1, 2022 with the version of the primary data for Jan. 1, 2010 that is available on Jan. 1, 2022 may slightly differ from the index value for Jan. 1, 2010 calculated on Jan. 1, 2010 with the version of the primary data that was available on Jan. 1, 2010. As such, the entity may be unable to confirm the accuracy of past index values, decreasing the usefulness of the auditing process.

SUMMARY

A blockchain index system stores index values and the primary data used for generating the index value in blocks of a blockchain. The primary data is received from a set of data sources, each associated with one or more index components of the index. Based on the received primary data, the index value is generated. A cryptographic hash value is generated based on the received primary data, the generated index value, and a previous hash value corresponding to a previous time period. The generated index value, the received primary data, and the generated cryptographic hash value are stored in a new block of the blockchain. In some embodiments, a digital signature is also calculated for the new block and stored in the new block of the blockchain.

The blocks of the blockchain are linked through the cryptographic hash values. Since the cryptographic hash functions used to generate cryptographic hash values are one-way functions, as more index values and corresponding new blocks are added to the blockchain after a given block, it becomes increasingly more difficult to modify the data stored in the given block. As such, users are able to access the primary data used for computing each of the index values by accessing the block corresponding to the index value, thus, allowing users to audit the index to verify that the index is being correctly generated.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Indices provide users with measures of the performance of a set of index components. In some embodiments, the set of index components are a representative sector or portion of an economy. For example, the Dow Jones Industrial Average is an index that tracks the performance of 30 large US corporations and is often used to measure the strength of the US economy.

Figure 1:
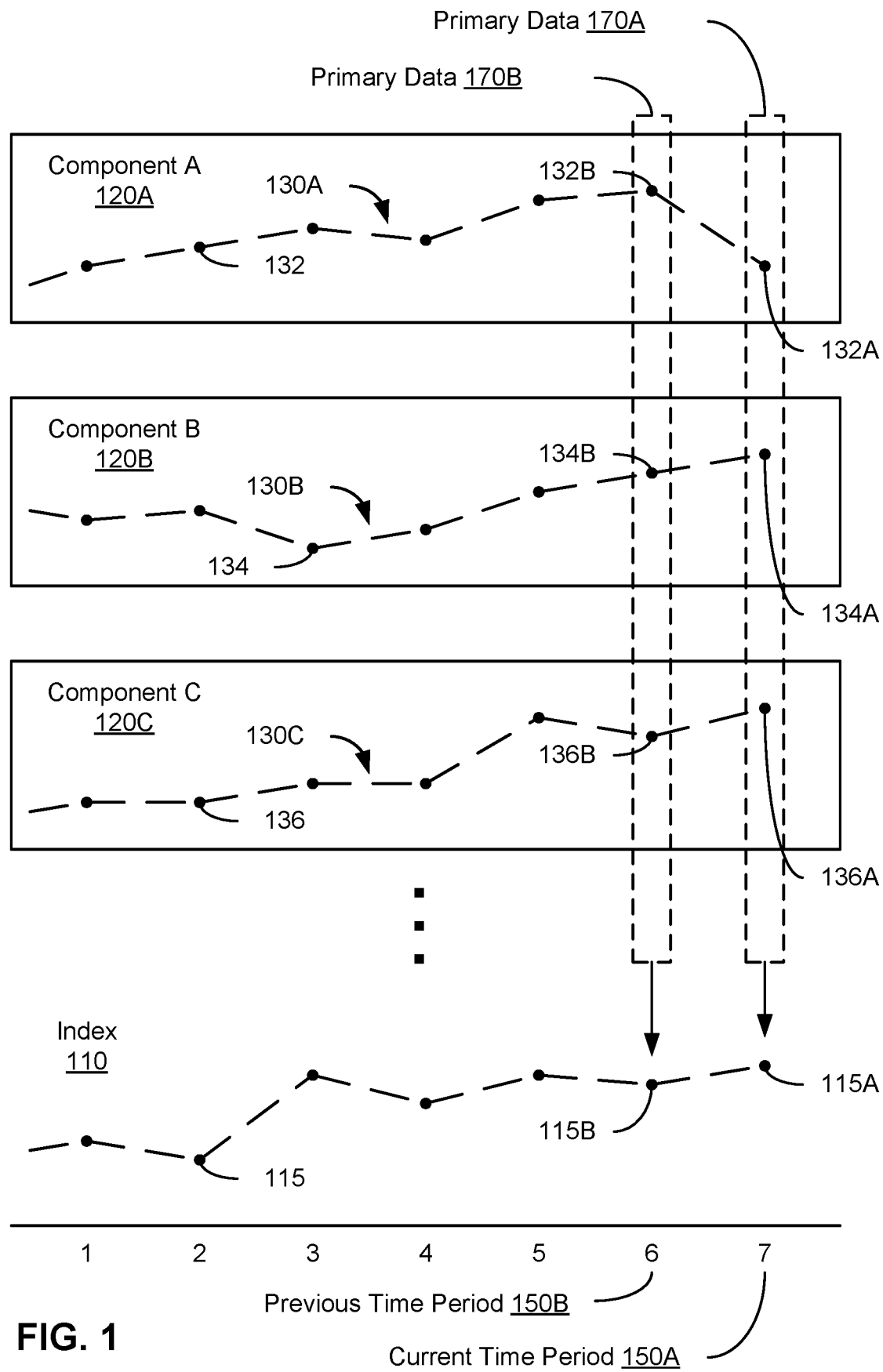
FIG. 1 illustrates a diagram for generating an index, according to one or more embodiments.

In some embodiments, an index is a time series of index values. Each index value of the index corresponds to a time point or time period, and is calculated based on primary data associated with each of the index components at the time point or time period. FIG. 1 illustrates a diagram for generating an index, according to one or more embodiments.

In the example of FIG. 1, the index 110 is composed of at least three index components 120. Each index component is associated with a time series having a set of component values at a set of time periods. The first index component 120A is associated with a first time series 130A having a set of data points 132. The second index component 120B is associated with a second time series 130B having a set of data points 134. The third index component 120C is associated with a third time series 130C having a set of data points 136.

The index 110 is a time series having a set of index values 115. Each index value is associated with a time period 150. Each index value 115A of the index 110 is generated based on primary data 170A corresponding to the time period associated with the index value. For example, the primary data 170 for generating the index value includes the index value 132A during the current time period 150A from the first time series 130A corresponding to the first index component 120A, the index value 134A during the current time period 150A from the second time series 130B corresponding to the second index component 120B, and the index value 136A during the current time period 150A from the third time series 130C corresponding to the third index component 120C. Similarly, the primary data 170B for generating the index value 115B includes the index value 132B during the previous time period 150B from the first time series 130A corresponding to the first index component 120A, the index value 134B during the previous time period 150B from the second time series 130B corresponding to the second index component 120B, and the index value 136B during the previous time period 150B from the third time series 130C corresponding to the third index component 120C.

In some embodiments, index values are periodically generated and stored for third party entities to access. Alternatively, the index value is generated in response to identifying a change in any of the index components (e.g., a change in the component value of a time series associated with an index component). Moreover, in some cases, the institutions that generate indices are required to maintain stringent records of how the indices are generated for auditing purposes. Typically, these institutions generate these records through record logging or manual processes. However, these methods for storing the primary data for the index can be inefficient and cumbersome, especially to ensure that the underlying data has not been inappropriately edited to influence the index.

System Architecture

Figure 2:
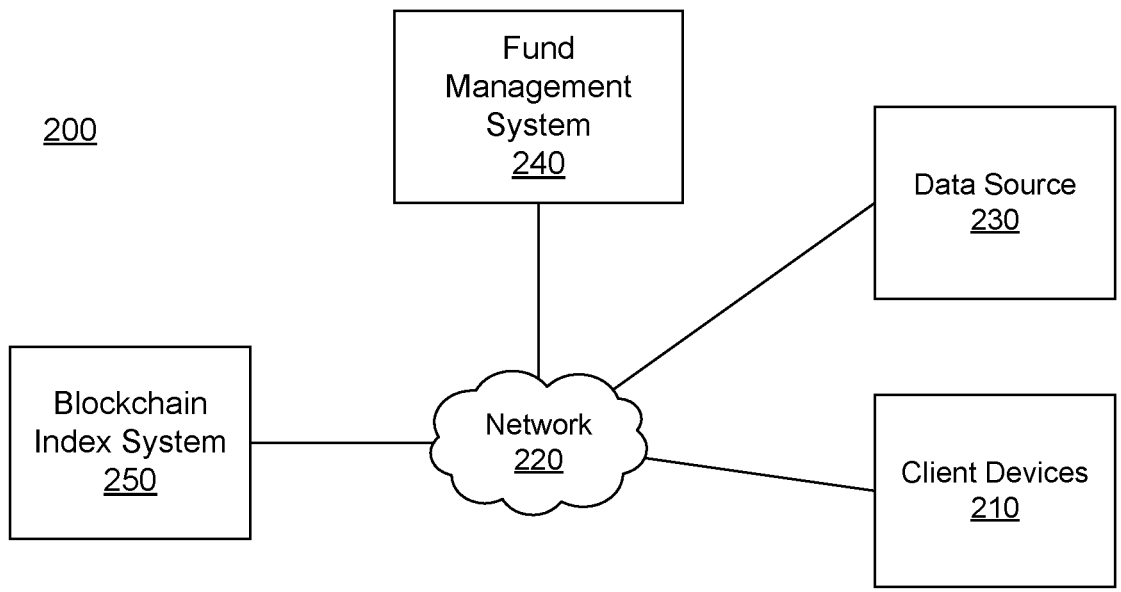
FIG. 2 is a block diagram of a system environment for a blockchain index system 250, according to one or more embodiments.

FIG. 2 is a block diagram of a system environment 200 for a blockchain index system 250, according to one or more embodiments. The system environment 200 shown by FIG. 2 comprises one or more client devices 210, a network 220, one or more data sources 230, the fund management system 240, and the blockchain index system 250. In alternative configurations, different and/or additional components may be included in the system environment 200.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone, or another suitable device. A client device 210 is configured to communicate via the network 220. In one embodiment, a client device 210 executes an application allowing a user of the client device 210 to interact with the blockchain index system 250. For example, a client device 210 executes a browser application to enable interaction between the client device 210 and the blockchain index system 250 via the network 220. In another embodiment, a client device 210 interacts with the blockchain index system 250 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more data sources 230 may be coupled to the network 220 for communicating with the blockchain index system 250. A data source 230 publishes primary data corresponding to one or more index components. For example, the data source 230 may be part of a market in which assets are traded. The data source 230 may transmit data on prices of stocks, options, futures, or other assets that may be traded on those markets. In some embodiments, the data sources 230 have an application programming interface (API) for requesting the primary data. The blockchain index system 250 may use the API to request and receive the primary data from each of the data sources. In other embodiments, the primary data is received using a secure file transfer protocol (SFTP), electronic messages (such as SMS or emails), asynchronous event notifications (such as Pub/Sub messaging), or any other suitable communication protocol.

The fund management system 240 maintains and controls assets that underlie an index that is tracked by the blockchain index system 250. For example, if the index tracks the Dow Jones Industrial Average, the fund management system 240 manages a fund that owns amounts of stocks that correspond to the stocks that make up the Dow Jones Industrial Average. The fund management system 240 may additionally trade assets that the fund management system 240 owns for other assets to ensure that it controls assets that are in compliance with the requirements of the index. For example, if the index specifies that 20% of the value of the fund be company stock, and the value of the stock currently owned by the fund management system 240 increases to be 25% of the value of the fund, then the fund management system 240 may sell some of the stock that it owns such that the overall value of the stock makes up 20% of the value of the fund. In some embodiments, the blockchain index system 250 is part of the fund management system 240.

In some embodiments, the fund management system 240 audits the index maintained by the blockchain index system 250. During an audit, the fund management system 240 retrieves the primary data for each of the components of the index and applies the index algorithm associated with the index to calculate index values based on the primary data. The fund management system 240 compares the calculated index values to the index values stored by the blockchain index system 250 to confirm that the index values are correct. In some embodiments, the fund management system 240 retrieves the primary data from the blockchain index system 250. Moreover, the fund management system 240 may also retrieve primary data from one or more data sources 230 and may compare the primary data retrieve from the blockchain index system 250 to the primary data retrieved from the data sources 230.

Figure 3:
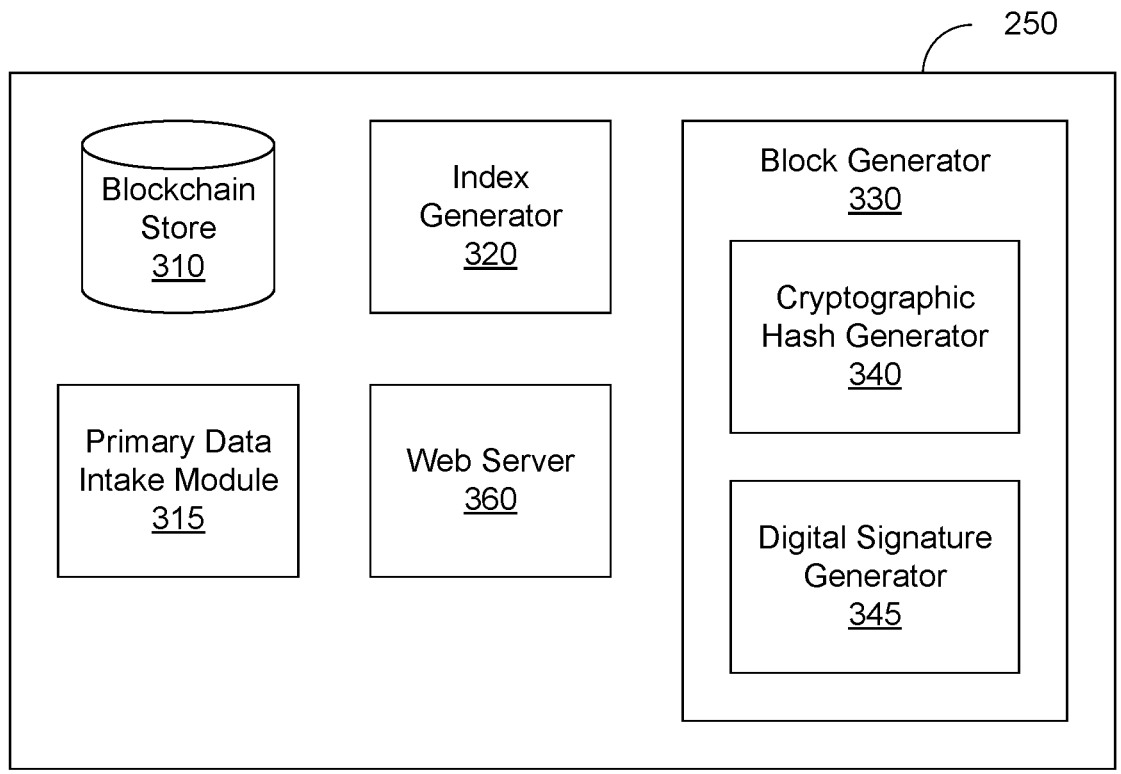
FIG. 3 is a block diagram of an architecture of the blockchain index system, according to one or more embodiments.

The blockchain index system 250 improves on conventional systems for generating indices by providing a simple data structure that efficiently and effectively demonstrates how the index was generated. FIG. 3 is a block diagram of an architecture of the blockchain index system 250, according to one or more embodiments. The blockchain index system 250 shown in FIG. 3 includes a blockchain store 310, a primary data intake module 315, an index generator 320, and a block generator 330. In other embodiments, the blockchain index system 250 may include additional, fewer, or different components for various applications. Conventional components such as network interfaces, security functions, load balancers, failover servers, management and network operations consoles, and the like are not shown so as to not obscure the details of the system architecture.

The blockchain store 310 stores one or more index blockchains. In some embodiments, the blockchain store 310 is not de-centralized. In some embodiments, index blockchains stored by the blockchain index system are stored in a centralized location.

A blockchain is a growing list of records (blocks) that are linked together through cryptography. Each block stores a payload, a cryptographic hash value of a previous block, and a cryptographic hash value of the current block. The cryptographic hash value of the current block is calculated based at least on the payload and the cryptographic hash value of the previous block. In some embodiments, each block additionally stores metadata (e.g., a timestamp). Moreover, in some embodiments, each block stores a digital signature for authenticating the block and allowing users of the blockchain index system 250 to verify that the block was generated by the blockchain index system 250. A more detailed description of a blockchain is provided below in conjunction with FIG. 4.

In some embodiments, each block in the blockchain corresponds to a new calculation of an index value of an index. Each time the blockchain index system 250 generates a new value of the index, the blockchain index system 250 generates a new block to store the newly generated index value and the primary data used for generating the index value. In some embodiments, the index is periodically generated (e.g., every set amount of time or at specific times), or is generated each time new primary data is received (e.g., when data associated with at least one component changes).

The primary data intake module 315 receives primary data from one or more data sources to generate index values based on the received primary data. In some embodiments, the primary data intake module 315 periodically requests new primary data from each of the data sources associated with each of the index components. Alternative, in other embodiments, each of the data sources sends updated primary data to the primary data intake module 315 when the value of the data changes.

The primary data intake module 315 may be configured to parse the primary data received from each of the sources and to format the primary data to be consumed by the index generator 320 and the block generator 330. For example, each data source may have a different API that returns data arranged with a different format. The primary data intake module 315 is configured to extract the primary data from each of the messages received from the data sources and to rearrange the primary data using a predetermined format.

The index generator 320 generates a new index value by applying a predetermined algorithm to the primary data received by the primary data intake module 315. In some embodiment, the algorithm for generating the index value may change over time. For example, the algorithm for generating the index value may be changed by adding or removing one or more index components from the index algorithm. Index components may be replaced when the performance of the index component falls outside of a set threshold range.

In some embodiments, the index generator 320 generates the index value using the primary data received from the primary data intake module 315. Alternatively, the index generator retrieves a portion of the primary data from the blockchain store 310. For example, during a current time period 150, the primary data intake module 315 receives primary data for a subset of index components 120 of the index 110. The index generator 320 identifies the primary data that was not received by the primary data intake module 315 and retrieves the missing primary data from the blockchain store 310. In some embodiments, the index generator 320 traverses the blockchain stored in the blockchain store 310 in reverse order (from the most recent block) until the missing primary data is found.

The block generator 330 generates new blockchain blocks for storing the index value and the primary data used for generating the index value. The block generator 330 has a cryptographic hash generator 340 and a digital signature generator 345.

The cryptographic hash generator 340 generates cryptographic hash values for the block to prevent the data stored in the block from being modified. The cryptographic hash value generated by the cryptographic hash generator 340 is stored in the block together with the index value and the primary data. If the index value or the primary data stored in the block is modified, the cryptographic hash value that is generated with the modified data would not match the cryptographic hash value generated by the cryptographic hash generator 340 and stored in the block.

The cryptographic hash generator 340 uses a preset cryptographic hash function. The cryptographic hash function is a one-way function. That is, the cryptographic hash function allows a set of data (message) to be converted into a hash (a message digest) of fixed size, in a manner that is computationally infeasible to invert or reverse. That is, given a hash, it is computationally infeasible to determine the message that was used to generate the hash. Moreover, the cryptographic hash function is deterministic (i.e., the same message will always result in the same hash). In some embodiments, the cryptographic hash function is configured such that a small change in the message will result in a large change in the hash, such that the new hash value for the modified message appears to be uncorrelated with the old hash value for the unmodified message.

In some embodiments, the cryptographic hash generator 340 applies the cryptographic hash algorithm to a message that includes the index value (as generated by the index generator 320), the primary data used for generating the index value, and a cryptographic hash value for a previous block in the blockchain. In some embodiments, the message additionally includes a digital signature (as generated by the digital signature generator 345) corresponding to the index value.

The digital signature generator 345 generates a digital signature for the block to allow users accessing the block to verify the authenticity of the block. The digital signature generator 345 uses a secret key (private key) and a preset algorithm to generate the digital signature. The private key is associated with a second key (public key) that can be used to verify the authenticity of the digital signature. For example, the public key can be used to decrypt the digital signature to obtain a message that was used to generate the digital signature. The digital signature is verified if the message obtained by decrypting the digital signature matches an expected message (e.g., determined based on contents of the block). In some embodiments, the signing algorithm used by the digital signature generator 345 that makes it computationally infeasible to generate the digital signature without knowing the private key, even though the public key is known. Moreover, given a public key and a set of signatures generated using the private key, it is computationally infeasible to determine the private key. As such, as long as the private key is kept secret, malicious entities are unable to generate a valid digital signature for signing blocks in the blockchain.

The web server 360 links the blockchain index system 250 via the network 220 to the one or more client devices 210. The web server 360 serves web pages, as well as other content, such as JAVA®, FLASH®, XML and so forth. The web server 360 may receive and route messages between the blockchain index system 250 and the client device 210, for example, instant messages, queued messages (e.g., email), text messages, short message service (SMS) messages, or messages sent using any other suitable messaging technique. A user may send a request to the web server 360 to upload information (e.g., information for creating a new index). Additionally, the web server 360 may provide application programming interface (API) functionality to send data directly to native client device operating systems, such as IOS®, ANDROID™, or BlackberryOS.

In some embodiments, client devices 210 may transmit a request to the blockchain index system 250 for one or more blocks of the blockchain. The blockchain index system 250 can transmit the requested one or more blocks of the blockchain in response to receiving the request. In some embodiments, the blockchain index system 250 may transmit new blocks of the blockchain to the client devices 210 whenever the blockchain index system 250 generates a new block for the blockchain. The blocks transmitted to the client devices 210 by the blockchain index system 250 may include a digital signature generated by the blockchain index system 250 that confirms that the blocks were generated by the blockchain index system 250.

Index Blockchain

Figure 4:
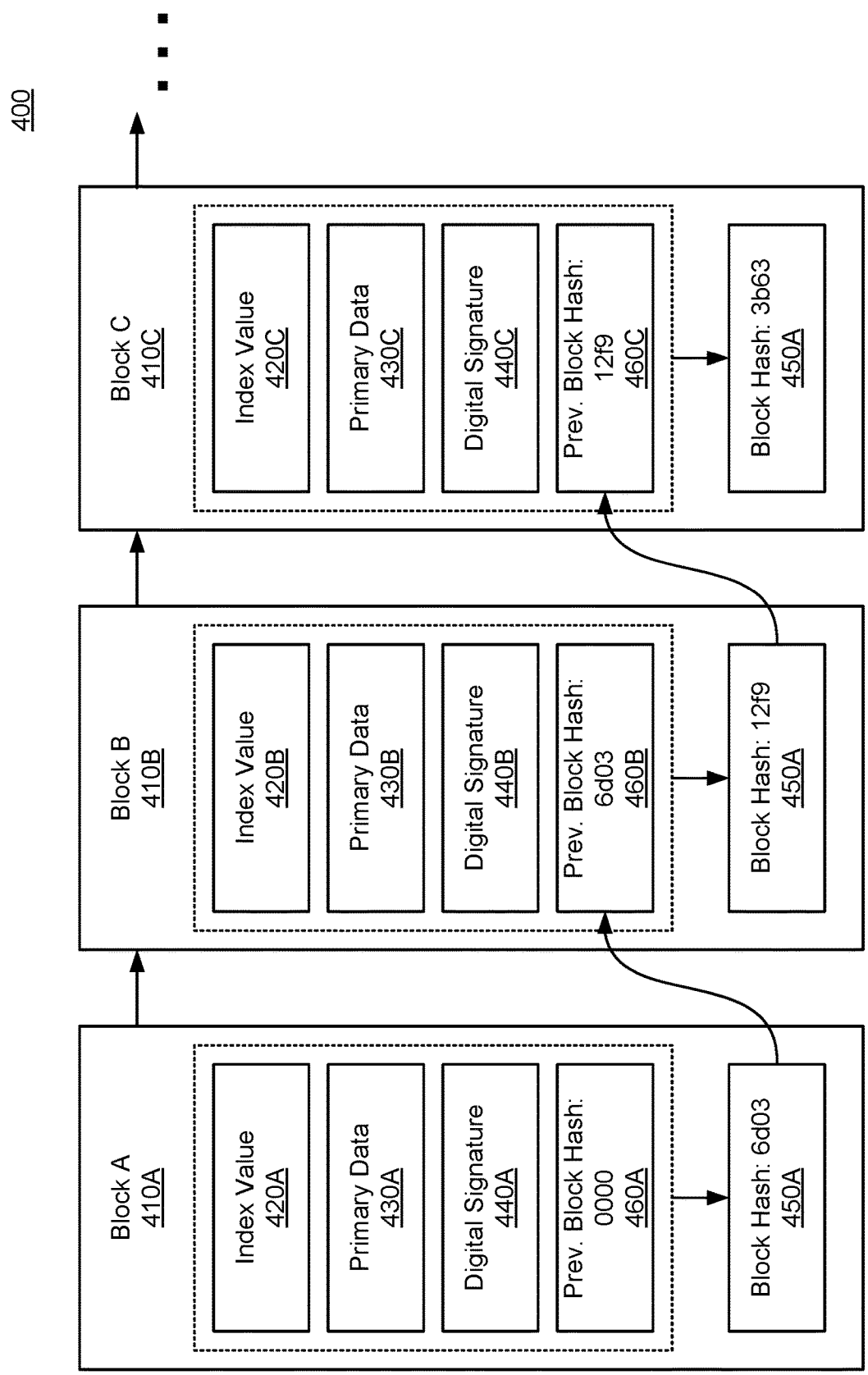
FIG. 4 illustrates an example index blockchain that may be used by a blockchain index system to store values associated with an index, according to one or more embodiments.

FIG. 4 illustrates an example index blockchain 400 that may be used by a blockchain index system 250 to store values associated with an index, according to one or more embodiments. Each block 410 in the index blockchain 400 stores an index value 420 of the index at a particular point in time or during a particular time period. Additionally, each block 410 in the index blockchain 400 stores the primary data 430 used to generate the corresponding index value 420. For example, block A 410A stores the primary data 430A that was used to generate index value 420A corresponding to a first time period, block B 410B stores the primary data 430B that was used to generate index value 420B corresponding to a second time period, and block C 410C stores the primary data 430C that was used to generate index value 420C corresponding to a third time period.

In some embodiment, primary data 430 includes stock prices, bond interest values and prices, fund share values, corporate earnings information, options prices, futures contract prices or information, corporate actions, corporate fundamentals, or currency exchange information. The primary data 430 may be stored with a predetermined format. For example, the primary data 430 is stored as a data structure specific to the index associated with the index blockchain 400.

In some embodiments, the primary data 430 for a block 410 contains incremental data used to generate the index value 420 for the block 410. Incremental data is data that represents how the primary data used to generate the index value 420 for the block 410 has changed from the previous block 410 in the index blockchain 400. For example, if block A 410A is the first block 410 in the index blockchain 400, then the primary data 430A stored in block A 410A may store all of the data needed to generate the index value 420A for Block A 410A. However, when the blockchain index system generates block B 410B, the next block 410 in the index blockchain 400, the primary data 430B stored in block B 410B may only contain primary data 430 that has changed since Block A 410A was generated. For example, if the index value 420 is generated based on a stock price, a bond price, and an option price and only the stock price has changed since Block A 410A was generated, then the primary data 430B in block B 410B may only contain the updated stock price.

In some embodiments, the incremental data is the difference between the primary data for the previous time period and the primary data used for generating the index stored in the latest block 410 of the index blockchain 400. For example, the incremental primary data 430C for block C 410C is the difference between the values of the primary data during the time period associated with the index value 420C of block C 410C and the primary data 430B during the time period associated with the index value 420B of block B 410B.

In some embodiments, the incremental data 430 is data that has changed since the previous time period. For example, if primary data 430 for a subset of index components 120 has changed since the previous time period, only the primary data 430 for the index components 120 that have changed is stored in the block 410, and the primary data 430 for the index components 120 that have not changed are omitted. As such, to obtain the primary data 430 for the components 120 that have not changed, a user may traverse the index blockchain 400 in reverse order until the primary data 430 for the index component 120 is found.

In some embodiments, the blockchain index system generates a new block 410 in the index blockchain 400 when the composition of the portfolio underlying the index changes. For example, if an asset is added to the portfolio, then the blockchain index system may generate a new block 410 that contains incremental data with the amount and value of the newly-added asset. Similarly, the blockchain index system may generate a new block 410 with incremental data that indicates a change of an amount of an asset included in the portfolio or incremental data that indicates a removal of an asset from the portfolio. Incremental data may be represented as the differences of how the primary data 430 has changed or may be represented as new data that is meant to replace the older primary data 430. Furthermore, in some embodiments, only a subset of the blocks 410 in the index blockchain 400 store incremental data in the primary data 430. For example, some blocks 410 may store all of the primary data 430 to generate their corresponding index value 420, and some of the blocks may only store incremental data.

In some embodiments, each block 410 in the index blockchain 400 also stores the current value and composition of a portfolio for a fund owned by the blockchain index system 250 or the fund management system 240 and may store expected future rebalancing that the blockchain index system 250 or the fund management system 240 may need to apply to its portfolio. Furthermore, a block 410 in the index blockchain 400 may store metrics associated with the fund's portfolio, such as the total return, the net total return, the daily return, or the volatility.

Each block 410 in the index blockchain 400 may further include a digital signature 440 associated with the blockchain index system 250. The digital signature allows users of the blockchain index system 250 to confirm that a block 410 from the index blockchain 400 was generated by the blockchain index system 250. The digital signature generator 345 may generate a digital signature 440 for the block 410 based at least on the index value 420, the primary data 430, and a private key associated with the blockchain index system 250, and the blockchain index system 250 stores the generated signature together with the index value 420 and the primary data 430. The private key associated with the blockchain index system 250 is associated with a corresponding public key that is accessible by users of the blockchain index system 250. The users of the blockchain index system 250 can then use the public key to verify that the signature included in the block 410 is a valid signature.

Each block 410 in the index blockchain 400 stores a block hash 450 associated with the block 410. The block hash 450 is generated by applying a hashing algorithm (e.g., SHA 256) to data stored by the block 410. For example, the block hash 450 may be generated by applying a hashing algorithm to the index value 420, the primary data 430, or the digital signature 440. The block hash 450 for a block 410 is also generated based on a previous block hash 460 corresponding to a block preceding the block 410 in the index blockchain 400. For example, the block hash 450B for block B 410B is generated based on the previous block hash 460B, which corresponds to the block hash 450A of Block A 410A. In some embodiments, for the first block 410 in the index blockchain 400, the previous block hash 460 may be represented by a null value or other some pre-determined value. For example, for Block A 410A, the previous block hash 460A is 0000.

In some embodiments, each block 410 in the index blockchain 400 stores its corresponding previous block hash 460. The previous block hash 460 links a block 410 with another block 410 to form a chain of blocks. If the data (such as the index value or the primary data for generating the index value) stored in a given block (e.g., block A 410A) is modified, the block hash (e.g., block hash 460A) for the given block changes. Since the block hash of the given block is included in the next block (e.g., block B 410B), and the block hash is used for generating the block hash (e.g., block hash 460B) of the next block, the next block and the block hash of the next block is affected by the modification in the given block. Moreover, every block after the next block is also affected by the modification in the given block.

Since the primary data for generating an index during a given time period is stored together with the generated index values, users accessing the blockchain can verify the accuracy of the index value without having to retrieve the primary data from each of the data sources. Moreover, by using a blockchain structure, the values for the primary data used for generating each of the index values are stored in the blockchain in a manner that is difficult to be modified. As such, even if the data stored in the data sources changes (e.g., in response to a re-evaluation of the primary data), the original data that was used for generating the index values remain available through the blockchain index system 250. Moreover, in some embodiments, each block is self-contained, and each index value can be verified by accessing the data that is stored within a single block.

Additionally, since blocks in the blockchain are immutable, the primary data used for geniting each specific index values can be acquired from the block, even if the data source has subsequently modified the value of the primary data. For example, as new information is available to a data source, providing primary data for calculating an index, the data source may periodically revise the historical values of one or more data points of the primary data. As such, a user retrieving the primary data corresponding to a particular day and time in the past may not receive the same values that blockchain index system 250. As such, the values used by the blockchain index system 250 to generate an index value for the particular day and time may not match the values obtained later on to audit the index value. However, by using blocks in a blockchain to store the primary data used by the blockchain index system 250 to calculate an index value, someone performing an audit of the index value can obtain the same values used by the blockchain index system 250 for calculating the index value by accessing the block associated with the index value.

In some embodiments, the first block in the index blockchain (e.g., a genesis block) stores additional information that may not be stored by other blocks in the index blockchain. For example, the genesis block of the index blockchain may store information about the algorithm for calculating index values for the index associated with the index blockchain, information about an initial composition of the index associated with the index blockchain, information about the data sources 230 that provide the primary data for calculating index values of the index associated with the index blockchain, information about a public key for verifying digital signatures of the blockchain index system 250, etc.

Blockchain Generation

Figure 5:
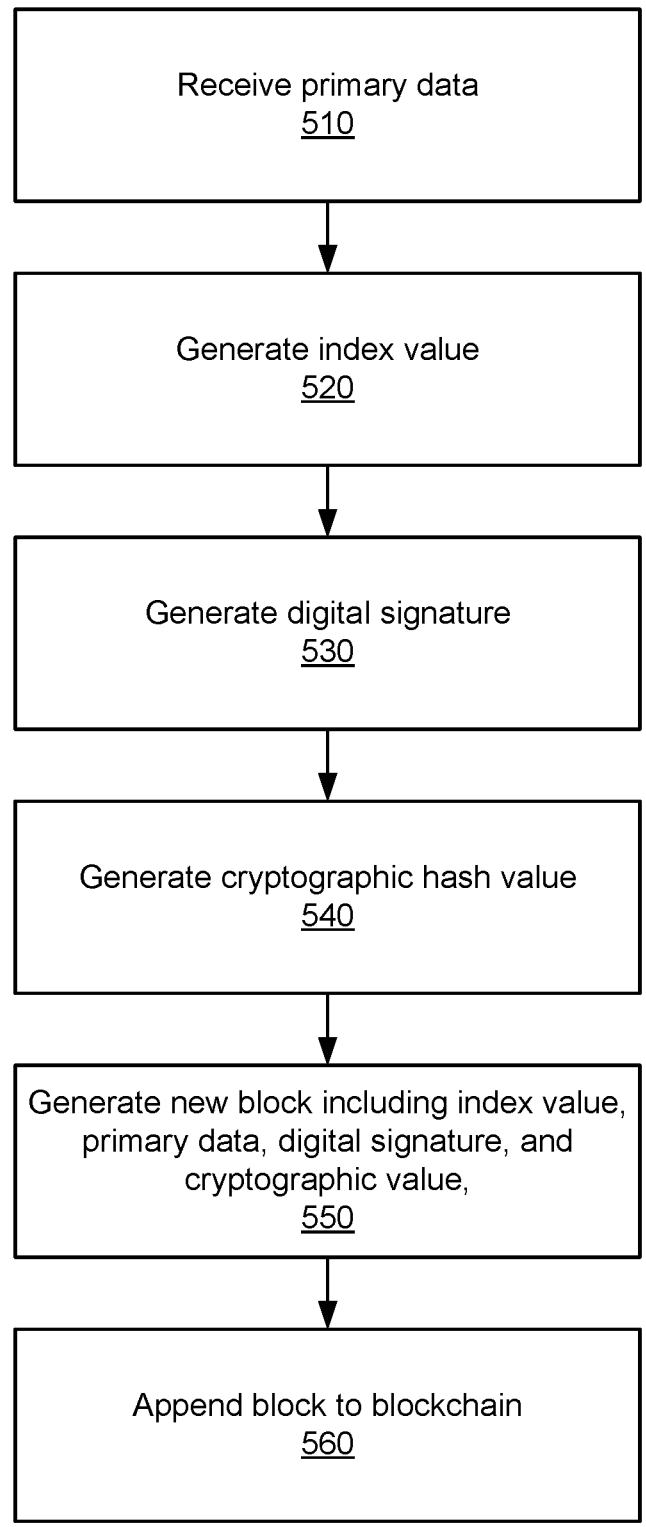
FIG. 5 illustrates a flow diagram of a process for storing primary data for generating index values of an index, according to one or more embodiments.

FIG. 5 illustrates a flow diagram of a process for storing primary data for generating index values of an index, according to one or more embodiments. Specifically, FIG. 5 illustrates a flow diagram of a process for creating a new block storing the index value and the primary data used for generating the index value, and appending the block to an index blockchain. In some embodiments, the blockchain index system 250 generates a new block 410 for the index blockchain 400 on a regular, periodic basis (e.g., every minute, every hour, every day). The blockchain index system 250 also may generate a new block 410 for the index blockchain 400 when the primary data 430 for the current index value changes. For example, the blockchain index system 250 may generate a new block 410 when the blockchain index system 250 detects a change to a stock price that is used to generate the value of the index.

The blockchain index system 250 receives 510 primary data for generating an index value of the index during the current time period. The primary data is received from a set of data sources, each associated with one or more components of the index. In some embodiments, the primary data intake module 315 periodically pulls data from each of the data sources 230 (e.g., by using an API of the data sources). Alternatively, the primary data intake module 315 registers with each of the data sources 230 and the data sources 230 push primary data to the primary data intake module 315 whenever there is a change in the primary data provided by the data source.

Based on the received primary data, the index generator 320 generates a new index value for the current time period. The index value is generated based on a preset algorithm applied to the received primary data. In some embodiments, the index value is further generated based on a previous index value associated with a previous time period, or based on primary data associated with the previous time period.

For example, the primary data received from the set of data sources may only include incremental data from the previous time period and the index generator 320 uses the primary data for the previous time period and the incremental data corresponding to the current time period to generate the new index value.

In some embodiments, digital signature generator 345 generates 530 a new signature to authenticate the newly generated index value. By analyzing the digital signature, a third party entity is able to verify that the index value was generated by the blockchain index system 250. For example, the third party entity can decrypt the digital signature using a public key associated with the blockchain index system 250 and compare the decrypted data to index value and/or the primary data used for generating the index value. If the public key associated with the blockchain index system 250 is able to decrypt the digital signature, the third party entity can confirm that the digital signature was generated using a secret private key owned by the blockchain index system 250. In some embodiments, the digital signature is generated based on the newly generated index value corresponding to the current time period. Additionally, the digital signature may be generated based on the primary data associated with the current time period.

The cryptographic hash generator 340 generates 540 a cryptographic hash value based on the index value and the primary data. In some embodiments, the cryptographic hash generator 340 further generates the cryptographic has value based on the digital signature associated with the index value. Using the cryptographic hash value, a third party entity is able to verify that the primary data and the index value have not been modified since the creation of a new block. Moreover, the cryptographic hash value is generated based on a cryptographic hash value of a previous block in the blockchain. As such, as more blocks are appending after a given block, the confidence of the verification process using the cryptographic hash value for the given block increases.

The block generator 330 generates 550 a new block to store the newly generated index value and the primary data associated with the index value. The new block additionally stores the digital signature and the cryptographic hash value corresponding to the newly generated index value. As such, most of the information to verify the integrity of the index value is available in the newly generated block. First, the block stores the primary data used for generating the index value. By accessing the block, a user of the blockchain index system 250 is able to apply the algorithm for generating the index to the primary data contained within the block to verify that the index value was generated correctly. Moreover, by accessing the primary data stored in the block, a user of the blockchain index system 250 is able to observe the state of each of the components of the index during the time period associated with the block.

Moreover, the block stores the digital signature associated with the index value. By accessing the block, a user of the blockchain index system 250 is able to verify that the index value was generated by the blockchain index system 250. In some embodiments, the blockchain stores the public key for verifying the digital signatures stored in each of the blocks of the blockchain. For example, the blockchain stores the public key in a genesis block (first block) of the blockchain. Alternatively, the public key is stored in a trusted location that users of the blockchain index system 250 can access to retrieve the public key.

Finally, the block stores the cryptographic hash value for verifying that the information stored in the block has not been tampered with. Users of the blockchain index system 250 are able to generate the cryptographic hash value using the information stored in the block and using a predetermined algorithm, and compare the generated cryptographic hash value to the cryptographic hash value stored in the block. If the generated cryptographic hash value matches the stored cryptographic hash value, the user of the blockchain index system 250 can be confident that the primary data and the index value have not been tampered with. Moreover, the level of confidence that the primary data and the index value have not been tampered with may be a function of the number of blocks that succeed a given block.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for storing data for generating index values of an index during a plurality of time periods, the index having a plurality of index components, the method comprising:
   receiving primary data from a set of data sources associated with the index, the primary data comprising data for a first index component of the plurality of index components during a current time period of the plurality of time periods, and data for a second index component of the plurality of index components during the current time period;
   generating an index value for the current time period based on the received primary data;
   generating a cryptographic hash value based at least on the received data for the first index component during the current time period, the received data for the second index component during the current time period, and a previous cryptographic hash value corresponding to a previous time period of the plurality of time periods; and
   storing a new block in a blockchain associated with the index, the new block including the generated index value for the current time period, the received primary data for the current time period, and the generated cryptographic hash value.

2. The method of claim 1, wherein the primary data includes incremental data from the previous time period, and wherein the index is further generated based on an index value for the previous time period.

3. The method of claim 1, wherein the primary data includes incremental data from the previous time period, and wherein the index is further generated based on primary data for the previous time period.

4. The method of claim 1, wherein the primary data for the current time period stored by the set of data sources changes after the index value for the current time period is generated.

5. The method of claim 1, wherein the primary data includes at least one of stock prices, bond interest values and prices, fund share values, corporate earnings information, option prices, futures contract prices or information, corporate actions, corporate fundamentals, and currency exchange information.

6. The method of claim 1, wherein the new block further stores a composition of a portfolio during the current time period.

7. The method of claim 1, wherein the new block further stores a description of an algorithm for generating the index value.

8. The method of claim 1, wherein the new block further stores a digital signature associated with a blockchain index system.

9. The method of claim 1, wherein the new block is generated responsive to determining that the primary data for the current time period of the plurality of time periods is different from primary data for the previous time period of the plurality of time periods.

10. The method of claim 1, wherein the primary data comprises values of a plurality of time series during the current time period.

11. The method of claim 1, wherein the index comprises a plurality of components, each component associated with a time series, and wherein the new block stores a value of the time series associated with each component of the index during the current time period.

12. The method of claim 11, wherein the set of data sources include a first data source associated with a first component of the plurality of components of the index, and wherein receiving the primary data comprises:
   sending a request to the first data source for a first component value during the current time period of the time series associated with the first component; and
   receiving the first component value during the current time period of the time series associated with the first component.

13. The method of claim 1, wherein the blockchain is stored in a centralized location.

14. The method of claim 1, wherein the blockchain is not de-centralized.

15. The method of claim 1, wherein a genesis block of the blockchain stores at least one of information about an algorithm for calculating index values for the index, information about an initial composition of the index, information about the set of data sources associated with the index, and a key for verifying a digital signature stored in each block of the blockchain.

16. A non-transitory computer readable storage medium storing instruction for generating index values of an index during a plurality of time periods, the index having a plurality of index components, the instructions when executed by a processor, cause the processor to:
   receive primary data from a set of data sources associated with the index, the primary data comprising data for a first index component of the plurality of index components during a current time period of the plurality of time periods, and data for a second index component of the plurality of index components during the current time period;
   generate an index value for the current time period based on the received primary data;
   generate a cryptographic hash value based at least on the received data for the first index component during the current time period, the received data for the second index component during the current time period, and a previous cryptographic hash value corresponding to a previous time period of the plurality of time periods; and
   store a new block in a blockchain associated with the index, the new block including the generated index value for the current time period, the received primary data for the current time period, and the generated cryptographic hash value.

17. The non-transitory computer readable storage medium of claim 16, wherein the new block further stores a digital signature associated with a blockchain index system.

18. The non-transitory computer readable storage medium of claim 16, wherein the new block is generated responsive to determining that the primary data for the current time period of the plurality of time periods is different from primary data for the previous time period of the plurality of time periods.

19. The non-transitory computer readable storage medium of claim 16, wherein the index comprises a plurality of components, each component associated with a time series, and wherein the new block stores a value of the time series associated with each component of the index during the current time period.

20. The non-transitory computer readable storage medium of claim 19, wherein the set of data sources include a first data source associated with a first component of the plurality of components of the index, and wherein receiving the primary data comprises:

sending a request to the first data source for a first component value during the current time period of the time series associated with the first component; and receiving the first component value during the current time period of the time series associated with the first component.

\* \* \* \* \*